United States Patent [19]
Greco et al.

[11] Patent Number: 4,942,215
[45] Date of Patent: Jul. 17, 1990

[54] THERMOSETTING LIQUID COMPOSITION CONTAINING A POLYEPOXIDE AND A TRICARBOXYLIC ISOCYANURATE

[75] Inventors: Alberto Greco, Dresano; Luigi Raisa, Induno Olona, both of Italy

[73] Assignee: Enichem Synthesis S.p.A., Palermo, Italy

[21] Appl. No.: 273,358

[22] Filed: Nov. 18, 1988

[30] Foreign Application Priority Data

Nov. 27, 1987 [IT] Italy ........................ 22788 A/87

[51] Int. Cl.$^5$ ............................................. C08G 59/42
[52] U.S. Cl. ..................................... 528/114; 525/504; 528/93; 528/94; 528/113; 528/115; 528/361; 528/363; 528/365; 528/367
[58] Field of Search ................... 525/504; 528/93, 94, 528/114, 361, 363, 365

[56] References Cited

U.S. PATENT DOCUMENTS

| | | | |
|---|---|---|---|
| 3,140,299 | 7/1964 | Loncrini | 549/244 |
| 3,182,073 | 5/1965 | Loncrini | 549/235 |
| 3,293,248 | 12/1970 | Sheffer | 528/114 |
| 3,767,617 | 10/1973 | Batzer et al. | 528/112 |
| 3,954,712 | 5/1976 | Lottanti et al. | 528/115 |

OTHER PUBLICATIONS

Chemical Abstract 86:108142n, "Thermosetting Resin Powder Coating Composition", Ishikawa et al.

*Primary Examiner*—Morton Foelak
*Assistant Examiner*—Frederick Krass
*Attorney, Agent, or Firm*—Hedman, Gibson, Costigan & Hoare

[57] ABSTRACT

A thermosetting liquid moulding composition comprising:

(a) a polyepoxide containing at least two epoxide groups per molecule;

(b) a tricarboxylic acid definable by the general formula:

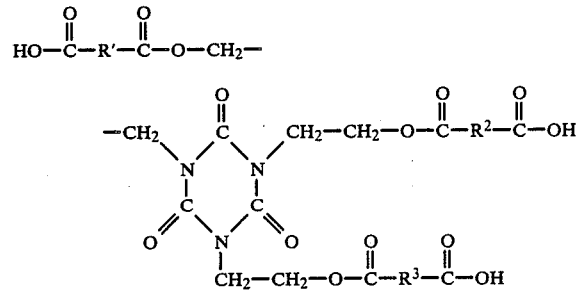

where: $R^1$, $R^2$ and $R^3$ have the meaning given in the description; and (c) a diacarboxylic acid anhydride.

This composition can be transformed by liquid moulding into manufactured articles particularly useful in the electrical sector.

9 Claims, No Drawings

THERMOSETTING LIQUID COMPOSITION CONTAINING A POLYEPOXIDE AND A TRICARBOXYLIC ISOCYANURATE

This invention relates to a thermosetting liquid composition containing a polyepoxide.

The invention also relates to manufactured articles obtainable from said composition, especially by the liquid moulding process. The desirable characteristics of a thermosetting composition for liquid moulding are its pre-setting fluidity for workability reasons, low shrinkage during setting and high glass transition temperature (tg) together with good mechanical and electrical characteristics and good thermal cycle resistance of the articles obtained.

Thermosetting liquid moulding compositions are known in the art containing a polyepoxide, a polycarboxylic acid and an anhydride of a dicarboxylic acid, such as described in U.S. Pat. Nos. 3,767,617 and 3,954,712. These known compositions are however poor with regard to volume contraction during setting. Furthermore with these compositions it is generally difficult to combine high tg values with required mechanical, thermal and electrical characteristics for the article when set.

The object of the present invention is to obviate the aforesaid drawbacks of the known art by a thermosetting liquid moulding composition comprising:
(a) a liquid polyepoxide containing at least two epoxide groups per molecule;
(b) a liquid tricarboxylic acid definable by the general formula:

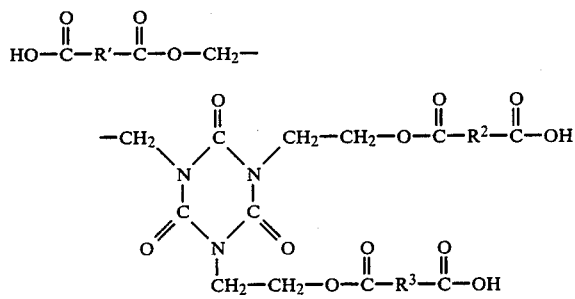

where:

R$^1$, R$^2$ and R$^3$, which can be identical or different, independently represent an alkylene group (containing from 1 to 14 carbon atoms); an alkenyl group (containing from 2 to 14 carbon atoms); a monocyclic or bicyclic alkylene or alkenyl group containing from 6 to 10 carbon atoms in the ring (possibly substituted with one or more alkyl groups); a phenylene group; or a phenylene group substituted with one or more halogen atoms); and
(c) a liquid anhydride of a dicarboxylic acid chosen from methyltetrahydrophthalic anhydride, methylnadic anhydride and dodecenylsuccinic anhydride; which for each epoxide equivalent of component (a) contains from 0.04 to 0.09 equivalents of said tricarboxylic acid (b) and from 0.48 to 0.82 moles of said anhydride (c).

The component (a) of the composition of the present invention can be any aliphatic, cycloaliphatic or aromatic polyepoxide which is liquid at ambient temperature (20°-25° C.) and contains two or more epoxide groups per molecule.

In particular, said component (a) can be chosen from the phenol glycidyl derivatives, for example the bisglycidyl derivatives of bishydroxyphenylmethane and bishydroxyphenyl propane; polyglycidyl ethers of the condensation products of phenol with formaldehyde (epoxynovolac resins); N-glycidyl derivatives of aromatic amines such as tetra-glycidylamino diphenylmethane and diglycidylaniline; glycidyl esters such as diglycidyl phthalate, diglycidyl tetrahydrophthalate and diglycidyl methyltetrahydrophthalate; di- or polyglycidylethers of a glycol or triazine such as diglycidylether of cyclohexanediethanol and diglycidylether of dihydroxycyclohexylmethane; triglycidylisocyanurates; and diolefin diepoxides such as cyclohexenedioxide and dicyclopentadiene dioxide.

Of these, the liquid epoxy resins deriving from the reaction of bisphenol-A with epichlorohydrin are preferred.

The component (b) of the composition of the present invention is preferably the product of the reaction between trihydroxyethylisocyanurate:

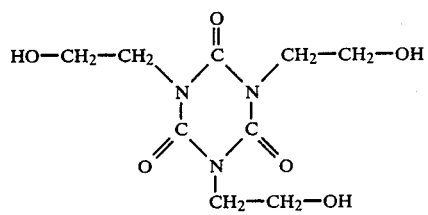

and an equivalent quantity of one or more anhydrides chosen from: maleic anhydride, succinic anhydride, dodecenylsuccinic anhydride, itaconic anhydride, citraconic anhydride, adipic anhydride, hexahydrophthalic anhydride, methyl-hexahydro-phthalic anhydride, nadic anhydride [endo-cis-bicyclo(2,2,1)-5-heptene-2,3-dicarboxylic anhydride], methyl nadic anhydride, tetrahydrophthalic anhydride, methyltetrahydrophthalic anhydride, phthalic anhydride and tetrachlorophthalic anhydride.

The reaction between trihydroxyethylisocyanurate and the aforesaid anhydrides is easily conducted by heating the reagents to a temperature of the order of 120°-180° C. possibly operating in the presence of catalytic quantities of a basic organic compound containing nitrogen, such as dimethylaminopyridine.

In the most preferred embodiment the component (b) of the composition of the present invention is the product of the reaction between trihydroxyethylisocyanurate and an equivalent quantity of at least one anhydride chosen from: phthalic anhydride, tetrahydrophthalic anhydride and succinic anhydride. The component (b) of the present invention generally has an acid value (expressed as mg of KOH/g) of between 210 and 315.

The liquid anhydrides which constitute component (c) of the composition can be partially substituted by an anhydride which is solid at ambient temperature provided that it is soluble, such as itaconic anhydride and tetrahydrophthalic anhydride. The preferred component (c) for the present invention is methyltetrahydrophthalic anhydride.

The composition of the present invention can also contain a crosslinking catalyst, normally chosen from tertiary amines (dimethylbenzylamine, dimethylaminopyridine), aminophenols (2,4,6-dimethylaminophenol), imidazoles (methyl-imidazole) and the like.

This catalyst can generally be present in a quantity of between 0.1 and 5 parts by weight per 100 parts by weight of the sum of components (a), (b) and (c).

The composition can also contain inorganic fillers (such as bentonite, titanium dioxide, iron oxide or quartz) or organic fillers (such as powdered polypropylene or other polyolefins and cellulose).

Further additives which can be present are thixotropic agents and flame-retarding agents.

The composition of the present invention can be prepared by mixing components (a), (b) and (c) in any order.

However in the preferred embodiment, a homogeneous mixture of components (b) and (c) is firstly prepared and then added to and homogenized with the component (a).

Under ambient temperature conditions the composition of the present invention has a viscosity of between 2000 and 20,000 mPa.s which gives it good workability.

Furthermore, said composition sets with low volume contraction, said contraction being generally in the range of about 1.7–2.2%. Finally, when set the manufactured articles obtained from the composition have a glass transition temperature (tg) within the range of 100°–130° C. while maintaining good mechanical, electrical and thermal cycle resistance characteristics and good elongation and flexibility values.

The composition of the present invention is particularly suitable for transformation into thermoset articles by liquid moulding, said articles being particularly useful for applications in the electrical sector.

The setting cycles for the composition are those usual in the art. A typical cycle comprises setting in a mould at 80° C. for 5 hours followed by post-setting at 130° C. for 16 hours.

The following experimental examples illustrate but do not limit the scope of the present invention.

Examples 1 to 3 relate to the preparation of component (b) of the composition of the present invention. Examples 4 to 13 relate to compositions according to the present invention and their transformation into manufactured articles.

EXAMPLE 1

Preparation of component (b) from trihydroxyethylisocyanurate, succinic anhydride and tetrahydrophthalic anhydride in a molar ratio of 1:2:1.

The following are fed under a nitrogen atmosphere into a flask fitted with a thermometer, bladed stirrer and a nitrogen connection:

| trihydroxyethylisocyanurate | 522.3 g (2.0 moles) |
|---|---|
| succinic anhydride | 400.3 g (4.0 moles) |
| tetrahydrophthalic anhdride | 304.3 g (2.0 moles) |
| dimethylaminopyridine | 0.59 g (0.5 per mil) |

The mixture is heated to 160° C. for 6 hours under effective stirring to obtain a reaction product with an acid value of 270 (theoretical value 273.8).

By a similar procedure a component (b) is prepared from trihydroxyethylisocyanurate, succinic anhydride and tetrahydrophthalic anhydride in a molar ratio of 1:1.5:1.5.

EXAMPLE 2

Preparation of component (b) from trihydroxyethylisocyanurate, phthalic anhydride and tetrahydrophthalic anhydride in a molar ratio of 1:1.5:1.5.

| trihydroxyethylisocyanurate | 480 g (1.837 moles) |
|---|---|
| phthalic anhydride | 408 g (2.574 moles) |
| tetrahydrophthalic anhydride | 419 g (2.4 moles) |
| dimethylaminopyridine | 3.92 g (0.3%) |

The mixture is heated to 160° C. for 6 hours under effective stirring to obtain a reaction product with an acid value of 215 (theoretical value 236).

EXAMPLE 3

Preparation of component (b) from trihydroxyethylisocyanurate and tetrahydrophthalic anhydride in a molar ratio of 1:3.

The procedure of Example 1 is followed reacting the following:

| trihydroxyethylisocyanurate | 800 g (3.062 moles) |
|---|---|
| tetrahydrophthalic anhydride | 1397.6 g (9.188 moles) |
| dimethylaminopyridine | 0.87 g (0.4 per mil) |

The mixture is heated to 160° C. for 6 hours under effective stirring to obtain a reaction product with an acid value of 228 (theoretical value 234).

Operating in a similar manner a component (b) is prepared by replacing the tetrahydrophthalic anhydride with an equivalent quantity of succinic anhydride.

EXAMPLE 4

80 g of a mixture containing 70% by weight of methyltetrahydrophthalic anhydride (component c) and 30% by weight of component (b), consisting of the product of the reaction between trihydroxyethylisocyanurate, phthalic anhydride and tetrahydrophthalic anhydride in a molar ratio of 1:1.5:1.5, are added to 100 g of epoxy resin formed from bisphenol-A and epichlorohydrin having an epoxide equivalent of about 190 and a viscosity of about 12,000 mPa.s (component a). 1 g of BDMA (benzyldimethylamine) is also added.

The mixture of components (b) and (c) has a viscosity of about 4000 mPa.s at 25° C.

The aforesaid components are carefully mixed to obtain a homogeneous mixture with a viscosity of about 8500 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| tensile strength GY (MN/m$^2$) (ISO R 527) | 50 |
|---|---|
| flexural strength 6 c (MN/m$^2$) (ISO R 178) | 134 |
| glass transition temperature (°C.) (DSC 4) | 121 |
| notch impact test (kj/m$^2$) (ISO R 180) | 1.7 |
| tg δ (%) at 25° C. (IEC 250) | 0.25 |
| at 80° C. | 0.20 |
| shrinkage (%) | 2 |

EXAMPLE 5

80 g of a mixture containing 70% by weight of methyltetrahydrophthalic anhydride (component c) and 30% by weight of component (b), consisting of the product of the reaction between trihydroxyethylisocyanurate, tetrahydrophthalic anhydride and succinic anhydride in a molar ratio of 1:1.5:1.5, are added to 100 g of epoxy resin formed from bisphenol-A and epichlorohydrin having an epoxide equivalent of about 190 and a viscosity of about 12,000 mPa.s (component a). 1 g of BDMA is also added. The mixture of components (b) and (c) has a viscosity of about 1250 mPa.s at 25° C.

The aforesaid components are carefully mixed to obtain a homogeneous mixture with a viscosity of about 4600 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| | |
|---|---|
| tensile strength GY (MN/m$^2$) (ISO R 527) | 65 |
| flexural strength 6 c (MN/m$^2$) (ISO R 178) | 111 |
| glass transition temperature (°C.) (DSC 4) | 117 |
| notch impact test (kj/m$^2$) (ISO R 180) | 1.2 |
| tg δ (%) at 25° C. (IEC 250) | 0.2 |
| at 80° C. | 0.44 |
| shrinkage (%) | 2.6 |

EXAMPLE 6

80 g of a mixture containing 70% by weight of methyltetrahydrophthalic anhydride (component c) and 30% by weight of component (b), consisting of the product of the reaction between trihydroxyethylisocyanurate, and succinic anhydride in a molar ratio of 1:3 are added to 100 g of epoxy resin formed from bisphenol-A and epichlorohydrin having an epoxide equivalent of about 190 and a viscosity of about 12,000 mPa.s (component a). 1 g of BDMA is also added.

The mixture of components (b) and (c) has a viscosity of about 4100 mPa.s at 25° C.

The aforesaid components are carefully mixed to obtain a homogeneous mixture with a viscosity of about 9500 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| | |
|---|---|
| tensile strength GY (MN/m$^2$) (ISO R 527) | 84 |
| flexural strength 6 c (MN/m$^2$) (ISO R 178) | 120 |
| glass transition temperature (°C.) (DSC 4) | 117 |
| notch impact test (kj/m$^2$) (ISO R 180) | 1.0 |
| tg δ (%) at 25° C. (IEC 250) | 0.3 |
| at 80° C. | 0.3 |
| shrinkage (%) | 2.16 |

EXAMPLE 7

90 g of a mixture containing 62% by weight of methyltetrahydrophthalic anhydride (component c) and 38% by weight of component (b), consisting of the product of the reaction between trihydroxyethylisocyanurate, and tetrahydrophthalic anhydride in a molar ratio of 1:3 are added to 100 g of epoxy resin formed from bisphenol-A and epichlorohydrin having an epoxide equivalent of about 190 and a viscosity of about 12,000 mPa.s (component a). 1 g of BDMA is also added.

The mixture of components (b) and (c) has a viscosity of about 25,000 mPa.s at 25° C.

The aforesaid components are carefully mixed to obtain a homogeneous mixture with a viscosity of about 17,000 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| | |
|---|---|
| tensile strength GY (MN/m$^2$) (ISO R 527) | 67 |
| flexural strength 6 c (MN/m$^2$) (ISO R 178) | 100 |
| glass transition temperature (°C.) (DSC 4) | 121 |
| notch impact test (kj/m$^2$) (ISO R 180) | 1.5 |
| tg δ (%) at 25° C. (IEC 250) | 0.2 |
| at 80° C. | 0.2 |
| shrinkage (%) | 2.1 |

EXAMPLE 8

85 g of a mixture containing 66% by weight of methyltetrahydrophthalic anhydride (component c) and 34% by weight of component (b), consisting of the product of the reaction between trihydroxyethylisocyanurate and tetrahydrophthalic anhydride in a molar ratio of 1:3 are added to 100 g of epoxy resin formed from bisphenol-A and epichlorohydrin having an epoxide equivalent of about 190 and a viscosity of about 12,000 mPa.s (component a). 1 g of BDMA is also added.

The mixture of components (b) and (c) has a viscosity of about 12,000 mPa.s at 25° C.

The aforesaid components are carefully mixed to obtain a homogeneous mixture with a viscosity of about 12,000 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| | |
|---|---|
| tensile strength GY (MN/m$^2$) (ISO R 527) | 65 |
| flexural strength 6 c (MN/m$^2$) (ISO R 178) | 133 |
| glass transition temperature (°C.) (DSC 4) | 124 |
| notch impact test (kj/m$^2$) (ISO R 180) | 0.9 |
| tg δ (%) at 25° C. (IEC 250) | 0.2 |
| at 80° C. | 0.16 |
| shrinkage (%) | 1.77 |

EXAMPLE 9

76 g of a mixture containing 74% by weight of methyltetrahydrophthalic anhydride (component c) and 26% by weight of component (b), consisting of the product of the reaction between trihydroxyethylisocyanurate and tetrahydrophthalic anhydride in a molar ratio of 1:3 are added to 100 g of epoxy resin formed from bisphenol-A and epichlorohydrin having an epoxide equivalent of about 190 and a viscosity of about 12,000 mPa.s (component a). 1 g of BDMA is also added.

The mixture of components (b) and (c) has a viscosity of about 2500 mPa.s at 25° C.

The aforesaid components are carefully mixed to obtain a homogeneous mixture with a viscosity of about 6500 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| | |
|---|---|
| tensile strength GY (MN/m$^2$) (ISO R 527) | 55 |
| flexural strength 6 c (MN/m$^2$) (ISO R 178) | 122 |
| glass transition temperature (°C.) (DSC 4) | 121 |
| notch impact test (kj/m$^2$) (ISO R 180) | 0.8 |
| tg δ (%) at 25° C. (IEC 250) | 0.2 |
| at 80° C. | 0.2 |
| shrinkage (%) | 1.79 |

EXAMPLE 10

72 g of a mixture containing 88% by weight of methyltetrahydrophthalic anhydride (component c) and 22% by weight of component (b), consisting of the product of the reaction between trihydroxyethylisocyanurate and tetrahydrophthalic anhydride in a molar ratio of 1:3 are added to 100 g of epoxy resin formed from bisphenol-A and epichlorohydrin having an epoxide equivalent of about 190 and a viscosity of about 12,000 mPa.s (component a). 1 g of BDMA is also added.

The mixture of components (b) and (c) has a viscosity of about 1150 mPa.s at 25° C.

The aforesaid components are carefully mixed to obtain a homogeneous mixture with a viscosity of about 4500 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| | |
|---|---|
| tensile strength GY (MN/m$^2$) (ISO R 527) | 50 |
| flexural strength 6 c (MN/m$^2$) (ISO R 178) | 128 |
| glass transition temperature (°C.) (DSC 4) | 117 |
| notch impact test (kj/m$^2$) (ISO R 180) | 1.4 |
| tg δ (%) at 25° C. (IEC 250) | 0.2 |
| at 80° C. | 0.2 |
| shrinkage (%) | 2.2 |

EXAMPLE 11

70 g of a mixture containing 66% by weight of methyltetrahydrophthalic anhydride (component c) and 34% by weight of component (b), consisting of the product of the reaction between trihydroxyethylisocyanurate and tetrahydrophthalic anhydride in a molar ratio of 1:3 are added to 100 g of epoxy resin formed from bisphenol-A and epichlorohydrin having an epoxide equivalent of about 190 and a viscosity of about 12,000 mPa.s (component a). 1 g of BDMA is also added.

The mixture of components (b) and (c) has a viscosity of about 12,500 mPa.s at 25° C.

The aforesaid components are carefully mixed to obtain a homogeneous mixture with a viscosity of about 12,000 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| | |
|---|---|
| tensile strength GY (MN/m$^2$) (ISO R 527) | 50 |
| flexural strength 6 c (MN/m$^2$) (ISO R 178) | 130 |
| glass transition temperature (°C.) (DSC 4) | 110 |
| notch impact test (kj/m$^2$) (ISO R 180) | 1.9 |
| tg δ (%) at 25° C. (IEC 250) | 0.23 |
| at 80° C. | 0.23 |
| shrinkage (%) | 2.1 |

EXAMPLE 12

75 g of a mixture containing 68% by weight of methyltetrahydrophthalic anhydride (component c) and 32% by weight of component (b), consisting of the product of the reaction between trihydroxyethylisocyanurate and tetrahydrophthalic anhydride in a molar ratio of 1:3 are added to 100 g of epoxy resin formed from bisphenol-A and epichlorohydrin having an epoxide equivalent of about 190 and a viscosity of about 12,000 mPa.s (component a). 1 g of BDMA is also added.

The mixture of components (b) and (c) has a viscosity of about 7300 mPa.s at 25° C.

The aforesaid components are carefully mixed to obtain a homogeneous mixture with a viscosity of about 9500 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| | |
|---|---|
| tensile strength GY (MN/m$^2$) (ISO R 527) | 60 |
| flexural strength 6 c (MN/m$^2$) (ISO R 178) | 138 |
| glass transition temperature (°C.) (DSC 4) | 116 |
| notch impact test (kj/m$^2$) (ISO R 180) | 1.0 |
| tg δ (%) at 25° C. (IEC 250) | 0.2 |
| at 80° C. | 0.2 |
| shrinkage (%) | 2 |

EXAMPLE 13

95 g of a mixture containing 75% by weight of methyltetrahydrophthalic anhydride (component c) and 25% by weight of component (b), consisting of the product of the reaction between trihydroxyethylisocyanurate and tetrahydrophthalic anhydride in a molar ratio of 1:3 are added to 100 g of epoxy resin formed from bisphenol-A and epichlorohydrin having an epoxide equivalent of about 190 and a viscosity of about 12,000 mPa.s (component a). 1 g of BDMA is also added.

The mixture of components (b) and (c) has a viscosity of about 2000 mPa.s at 25° C.

The aforesaid components are carefully mixed to obtain a homogeneous mixture with a viscosity of about 5500 mPa.s at 25° C., said mixture then being heated to 80° C., exposed to vacuum to remove the contained air and poured into moulds preheated to 80° C. The setting is conducted at 80° C. for 5 hours followed by 16 hours of post-setting at 130° C.

The following characteristics are then determined on the thermoset test pieces obtained:

| | |
|---|---|
| tensile strength GY (MN/m$^2$) (ISO R 527) | 69 |
| flexural strength 6 c (MN/m$^2$) (ISO R 178) | 128 |
| glass transition temperature (°C.) (DSC 4) | 129 |
| notch impact test (kj/m$^2$) (ISO R 180) | 1.4 |
| tg δ (%) at 25° C. (IEC 250) | 0.2 |
| at 80° C. | 0.2 |
| shrinkage (%) | 2.2 |

We claim:

1. A thermosetting liquid molding composition comprising:
   (a) a liquid polyepoxide containing at least two epoxide groups per molecule;
   (b) a liquid tricarboxylic acid having the formula

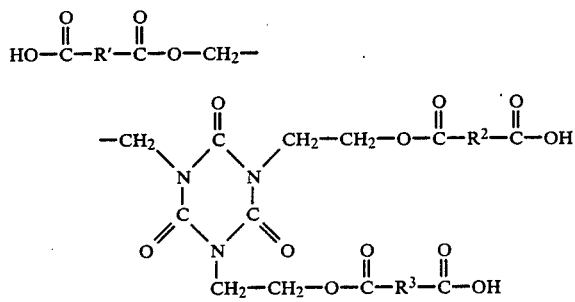

where: $R^1$, $R^2$ and $R^3$, which can be identical or different, independently are selected from the group consisting of an alkylene group containing from 1 to 14 carbon atoms; an alkenyl group containing from 2 to 14 carbon atoms; an unsubstituted monocyclic or bicyclic alkylene or alkenyl group having from 6 to 10 carbon atoms in the ring; a monocyclic or bicyclic alkylene or alkenyl group having from 6 to 10 carbons in the ring substituted with at least one alkyl group; a phenylene group; or a phenylene group substituted with at least one halogen atom; and
   (c) a liquid anhydride of a dicarboxylic acid selected from methyltetrahydrophthalic anhydride, methylnadic anhydride and dodecenylsuccinic anhydride; wherein for each epoxide equivalent of component (a) said composition contains from 0.04 to 0.09 equivalents of said tricarboxylic acid (b) and from 0.48 to 0.82 moles of said anhydride (c).

2. The composition of claim 1, wherein said component (a) is a liquid epoxy resin derived from bisphenol-A and epichlorohydrin.

3. The composition of claim 1, wherein said component (b) is the product of the reaction between trihydroxyethylisocyanurate and an equivalent quantity of one or more anhydrides selected from the group consisting of maleic anhydride, succinic anhydride, dodecenylsuccinic anhydride, itaconic anhydride, citraconic anhydride, adipic anhydride, hexahydrophthalic anhydride, methylhexahydrophthalic anhydride, nadic anhydride, methylnadic anhydride, tetrahydrophthalic anhydride, methyltetrahydrophthalic anhydride, phthalic anhydride and tetrachlorophthalic anhydride.

4. The composition of claim 3, wherein said anhydride is selected from the group consisting of phthalic anhydride, tetrahydrophthalic anhydride and succinic anhydride.

5. The composition of claim 1, wherein the liquid anhydride of component (c) is partially substituted by a solid, soluble anhydride selected from the group consisting of itaconic anhydride and tetrahydrophthalic anhydride.

6. The composition of claim 1, wherein said component (c) is methyltetrahydrophthalic anhydride.

7. The composition as claimed in claim 1, further comprising a crosslinking catalyst selected from the group consisting of tertiary amines, aminophenols and imidazoles in a quantity of between 0.1 and 5 parts by weight per 100 parts by weight of the sum of components (a), (b) and (c).

8. The composition of claim 1, further comprising at least one additive selected from the group consisting of organic fillers, inorganic fillers, thixotropic agents and flame-retarding agents.

9. A manufactured article obtained from the composition of claim 1.

* * * * *